US012645788B2

(12) United States Patent
Chandra et al.

(10) Patent No.: US 12,645,788 B2
(45) Date of Patent: Jun. 2, 2026

(54) AUTO SECURITY BREACH IDENTIFICATION AND CORRECTION

(71) Applicant: Dell Products L.P., Round Rock, TX (US)

(72) Inventors: Anurag Chandra, Pune (IN); Shiv Kumar, Pune (IN); Kaushik Gupta, Pune (IN)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 18/335,865

(22) Filed: Jun. 15, 2023

(65) Prior Publication Data

US 2024/0419790 A1     Dec. 19, 2024

(51) Int. Cl.
*G06F 21/55* (2013.01)

(52) U.S. Cl.
CPC .......... *G06F 21/554* (2013.01); *G06F 21/552* (2013.01)

(58) Field of Classification Search
CPC ............................. G06F 21/554; G06F 21/552
USPC ........................................................... 726/25
See application file for complete search history.

(56) References Cited

U.S. PATENT DOCUMENTS 7,397,770 B2 * 7/2008 Le ........................ H04L 41/0866
370/254
9,519,439 B2 * 12/2016 Sundarrajan ............ G06F 3/065

| 10,963,583 | B1 * | 3/2021 | Shimony | ................ G06F 21/577 |
| 2002/0046275 | A1 * | 4/2002 | Crosbie | .................. G06F 21/552 |
| | | | | 709/224 |
| 2002/0071554 | A1 * | 6/2002 | Scheidt | ................. H04L 9/0877 |
| | | | | 380/44 |
| 2002/0124053 | A1 * | 9/2002 | Adams | .................. H04L 63/101 |
| | | | | 709/219 |
| 2007/0050362 | A1 * | 3/2007 | Low | ..................... G06F 21/6245 |
| 2010/0115004 | A1 * | 5/2010 | Liao | ....................... G06F 21/575 |
| | | | | 711/E12.001 |
| 2011/0145924 | A1 * | 6/2011 | Kolsek | .................. G06F 21/554 |
| | | | | 726/25 |
| 2012/0143821 | A1 * | 6/2012 | Mallya | .................. H04L 41/046 |
| | | | | 707/639 |
| 2015/0339317 | A1 * | 11/2015 | Choudhary | ......... G06F 16/1744 |
| | | | | 707/625 |
| 2017/0243223 | A1 * | 8/2017 | Kolotinsky | ........ G06Q 20/4016 |
| 2020/0036731 | A1 * | 1/2020 | Bochare | ................ H04L 63/145 |
| 2020/0394089 | A1 * | 12/2020 | Garvey | ................. G06F 11/076 |
| 2021/0084049 | A1 * | 3/2021 | Kartoun | ................ H04L 63/102 |
| 2021/0406365 | A1 * | 12/2021 | Neil | ....................... G06F 21/554 |
| 2022/0050899 | A1 * | 2/2022 | Tormasov | ............. G06F 21/562 |
| 2022/0121620 | A1 * | 4/2022 | Rath | ..................... G06F 21/602 |

(Continued)

*Primary Examiner* — Taghi T Arani
*Assistant Examiner* — Pegah Barzegar
(74) *Attorney, Agent, or Firm* — Amin, Turocy & Watson, LLP

(57) ABSTRACT

A system can receive a request that is associated with a user account to perform an operation on the system. The system can evaluate the request based on a security breach policy to produce a security result. The system can, in response to determining that the security result indicates that there is a possible security breach, determine not to perform the operation, and perform a mitigating action regarding the possible security breach. The system can, in response to the security result indicating that the possible security breach does not exist, perform the operation.

20 Claims, 10 Drawing Sheets

(56) References Cited

U.S. PATENT DOCUMENTS

| | | | |
|---|---|---|---|
| 2023/0103474 A1* | 4/2023 | Gunda | G06F 11/1448 |
| | | | 711/162 |
| 2023/0247048 A1* | 8/2023 | Samosseiko | H04L 63/1416 |
| | | | 726/23 |
| 2024/0354411 A1* | 10/2024 | Wang | G06F 21/566 |
| 2024/0419790 A1* | 12/2024 | Chandra | G06F 21/554 |

* cited by examiner

100

SERVER 102

AUTO SECURITY BREACH
IDENTIFICATION AND
CORRECTION COMPONENT 108

DATA 110

CONFIG 112

SECURITY BREACH POLICY
114

COMMUNICATIONS
NETWORK
104

CLIENT COMPUTER 106

200

202

IDENTIFYING A SECURITY BREACH WHERE A USER DELETED A THRESHOLD NUMBER OF FILES WITHIN ANY DIRECTORY WITHIN A THRESHOLD TIME PERIOD 204

MAKING THE DIRECTORY READ-ONLY 206

NOT EXPIRING A SNAPSHOT OF THE DIRECTORY FOR A THRESHOLD TIME PERIOD 208

RAISING AN ALERT ABOUT A POSSIBLE DATA SECURITY BREACH TO AN ADMINISTRATOR 210

212

300

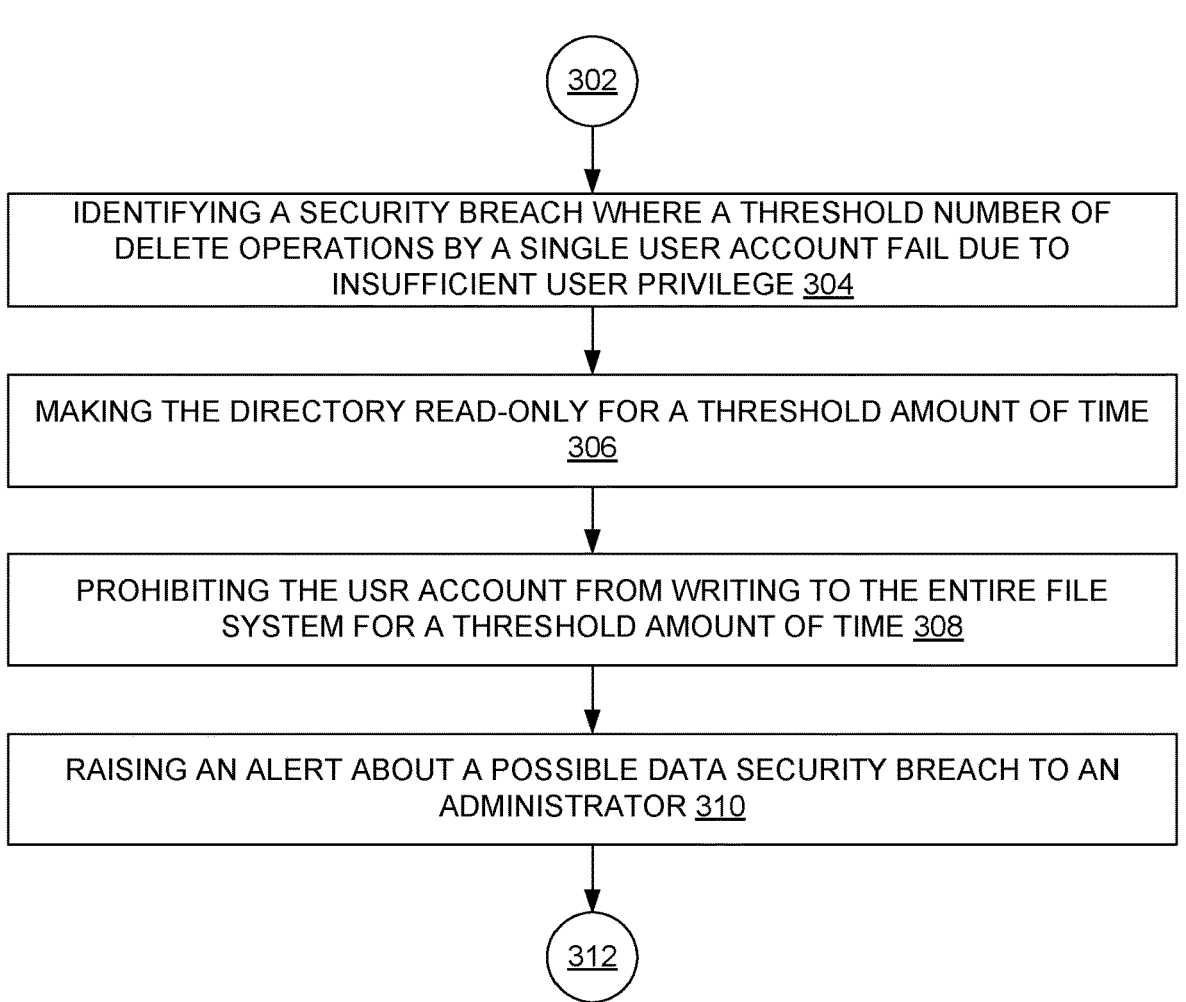

302

IDENTIFYING A SECURITY BREACH WHERE A THRESHOLD NUMBER OF DELETE OPERATIONS BY A SINGLE USER ACCOUNT FAIL DUE TO INSUFFICIENT USER PRIVILEGE 304

MAKING THE DIRECTORY READ-ONLY FOR A THRESHOLD AMOUNT OF TIME 306

PROHIBITING THE USR ACCOUNT FROM WRITING TO THE ENTIRE FILE SYSTEM FOR A THRESHOLD AMOUNT OF TIME 308

RAISING AN ALERT ABOUT A POSSIBLE DATA SECURITY BREACH TO AN ADMINISTRATOR 310

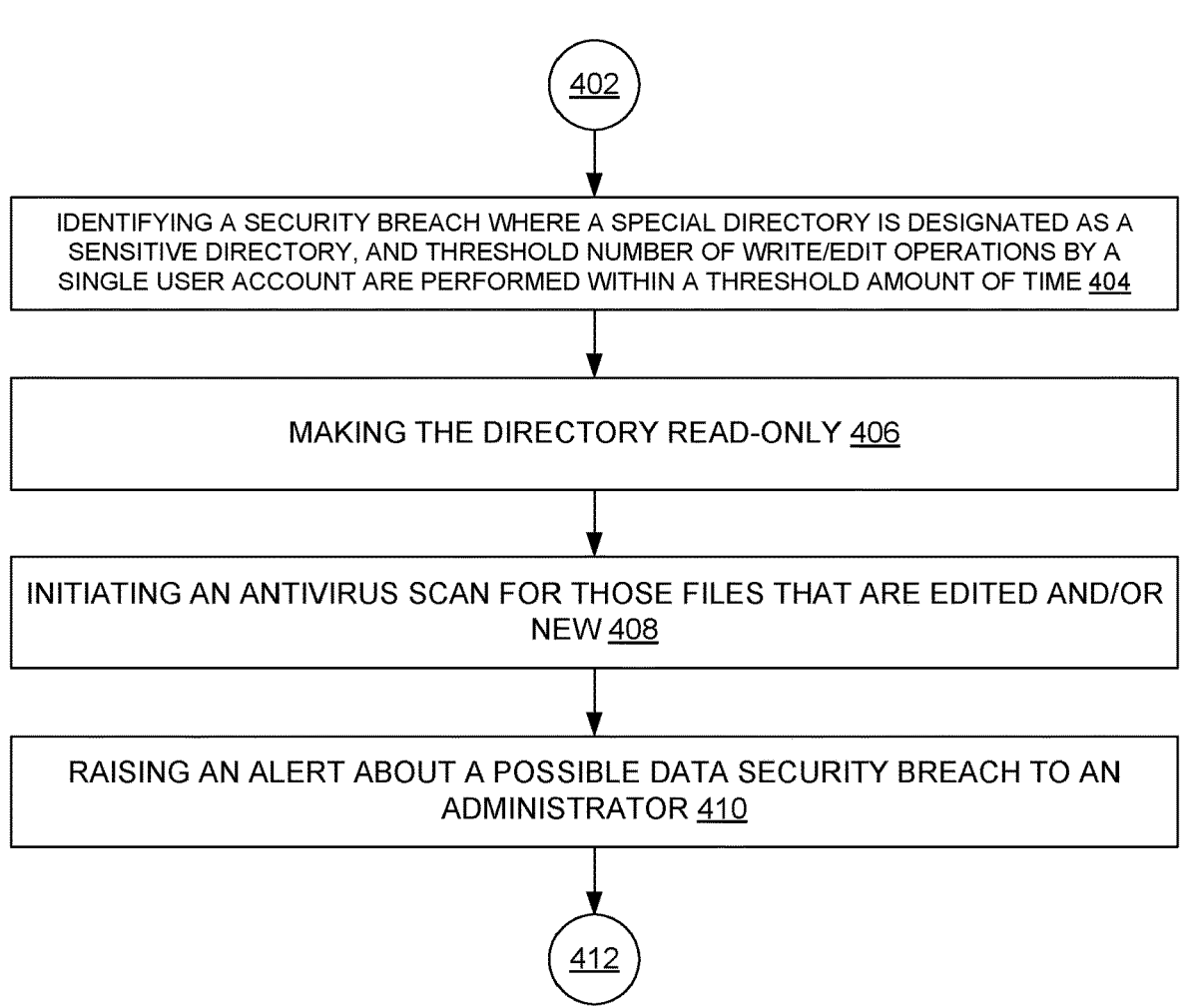

402

IDENTIFYING A SECURITY BREACH WHERE A SPECIAL DIRECTORY IS DESIGNATED AS A SENSITIVE DIRECTORY, AND THRESHOLD NUMBER OF WRITE/EDIT OPERATIONS BY A SINGLE USER ACCOUNT ARE PERFORMED WITHIN A THRESHOLD AMOUNT OF TIME 404

MAKING THE DIRECTORY READ-ONLY 406

INITIATING AN ANTIVIRUS SCAN FOR THOSE FILES THAT ARE EDITED AND/OR NEW 408

RAISING AN ALERT ABOUT A POSSIBLE DATA SECURITY BREACH TO AN ADMINISTRATOR 410

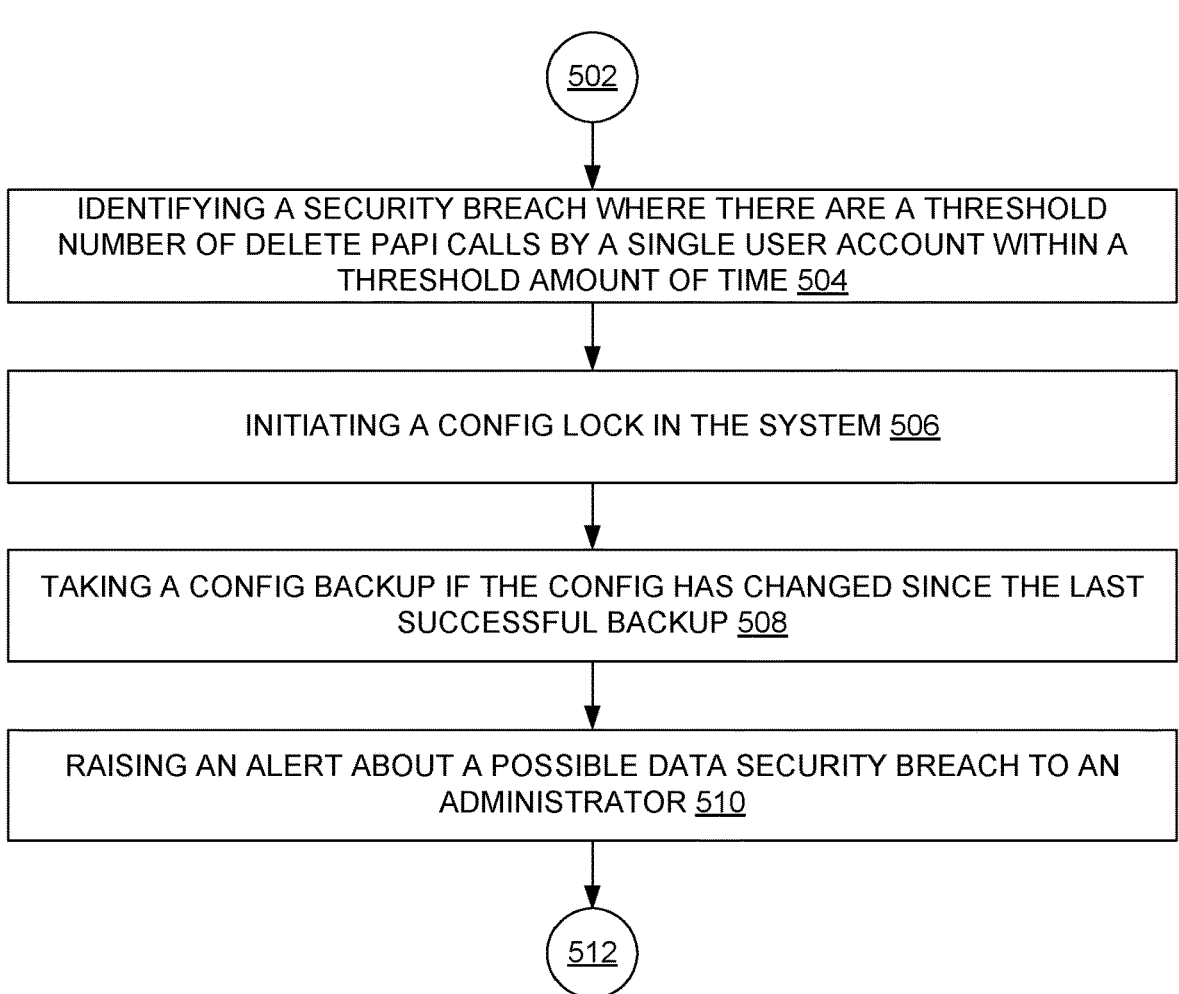
500
502
IDENTIFYING A SECURITY BREACH WHERE THERE ARE A THRESHOLD NUMBER OF DELETE PAPI CALLS BY A SINGLE USER ACCOUNT WITHIN A THRESHOLD AMOUNT OF TIME 504
INITIATING A CONFIG LOCK IN THE SYSTEM 506
TAKING A CONFIG BACKUP IF THE CONFIG HAS CHANGED SINCE THE LAST SUCCESSFUL BACKUP 508
RAISING AN ALERT ABOUT A POSSIBLE DATA SECURITY BREACH TO AN ADMINISTRATOR 510
512
FIG. 5

600

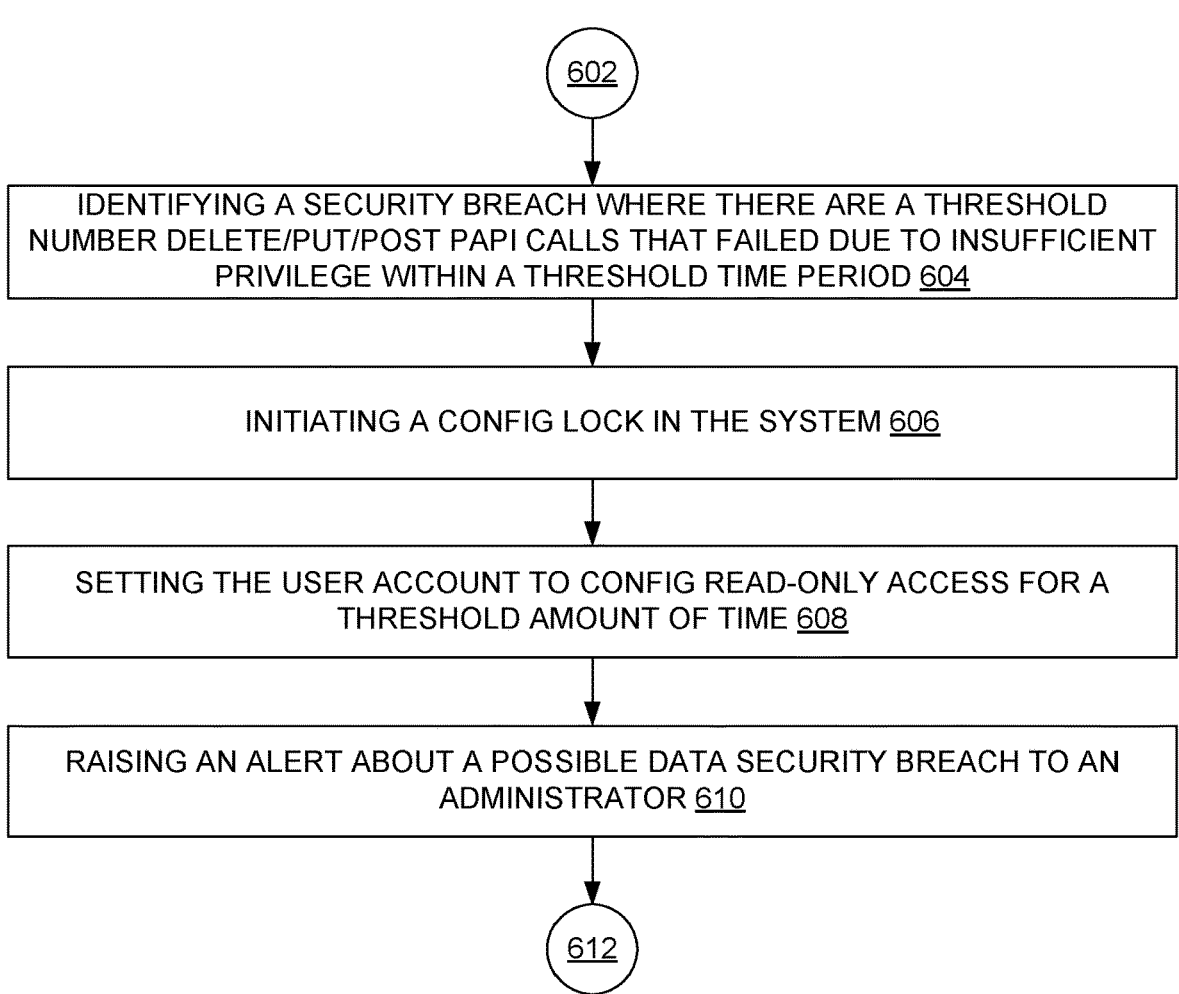

602

IDENTIFYING A SECURITY BREACH WHERE THERE ARE A THRESHOLD NUMBER DELETE/PUT/POST PAPI CALLS THAT FAILED DUE TO INSUFFICIENT PRIVILEGE WITHIN A THRESHOLD TIME PERIOD 604

INITIATING A CONFIG LOCK IN THE SYSTEM 606

SETTING THE USER ACCOUNT TO CONFIG READ-ONLY ACCESS FOR A THRESHOLD AMOUNT OF TIME 608

RAISING AN ALERT ABOUT A POSSIBLE DATA SECURITY BREACH TO AN ADMINISTRATOR 610

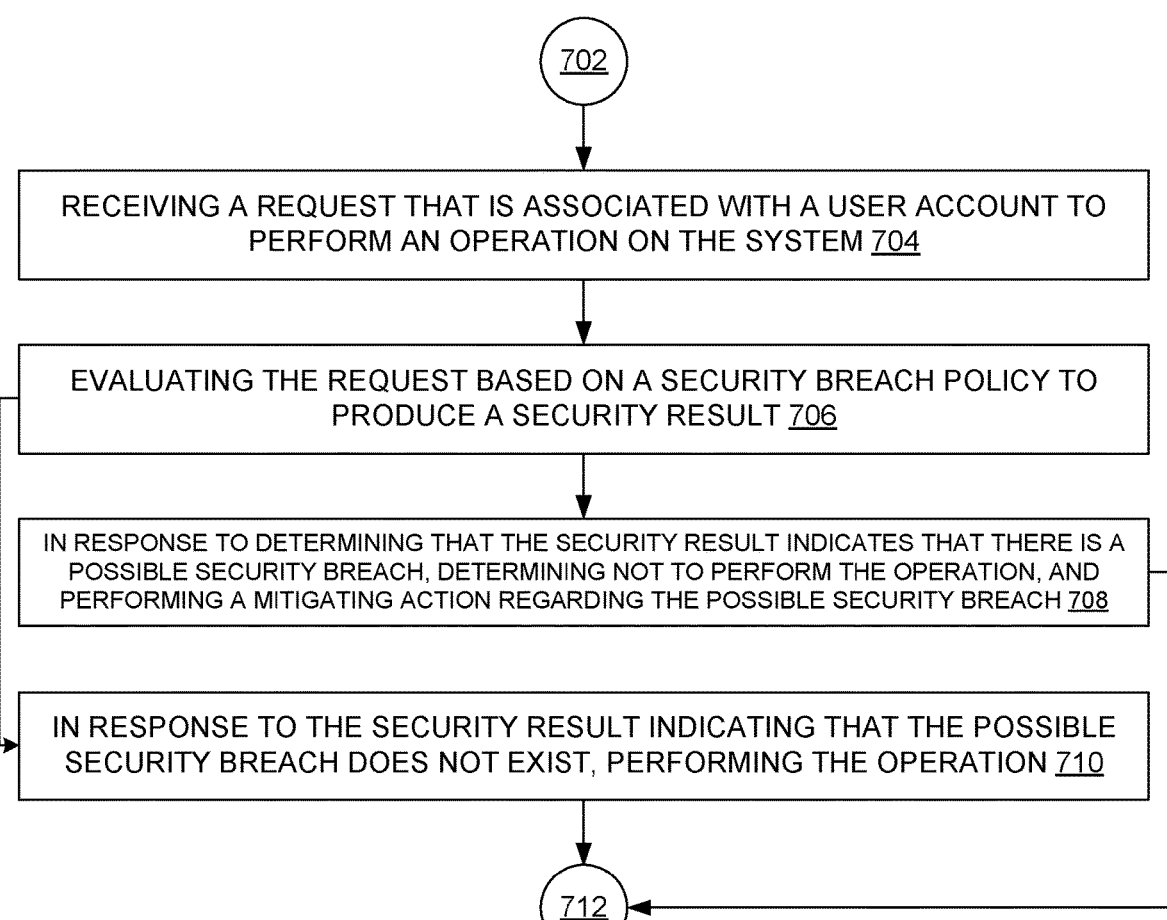

702

RECEIVING A REQUEST THAT IS ASSOCIATED WITH A USER ACCOUNT TO PERFORM AN OPERATION ON THE SYSTEM 704

EVALUATING THE REQUEST BASED ON A SECURITY BREACH POLICY TO PRODUCE A SECURITY RESULT 706

IN RESPONSE TO DETERMINING THAT THE SECURITY RESULT INDICATES THAT THERE IS A POSSIBLE SECURITY BREACH, DETERMINING NOT TO PERFORM THE OPERATION, AND PERFORMING A MITIGATING ACTION REGARDING THE POSSIBLE SECURITY BREACH 708

IN RESPONSE TO THE SECURITY RESULT INDICATING THAT THE POSSIBLE SECURITY BREACH DOES NOT EXIST, PERFORMING THE OPERATION 710

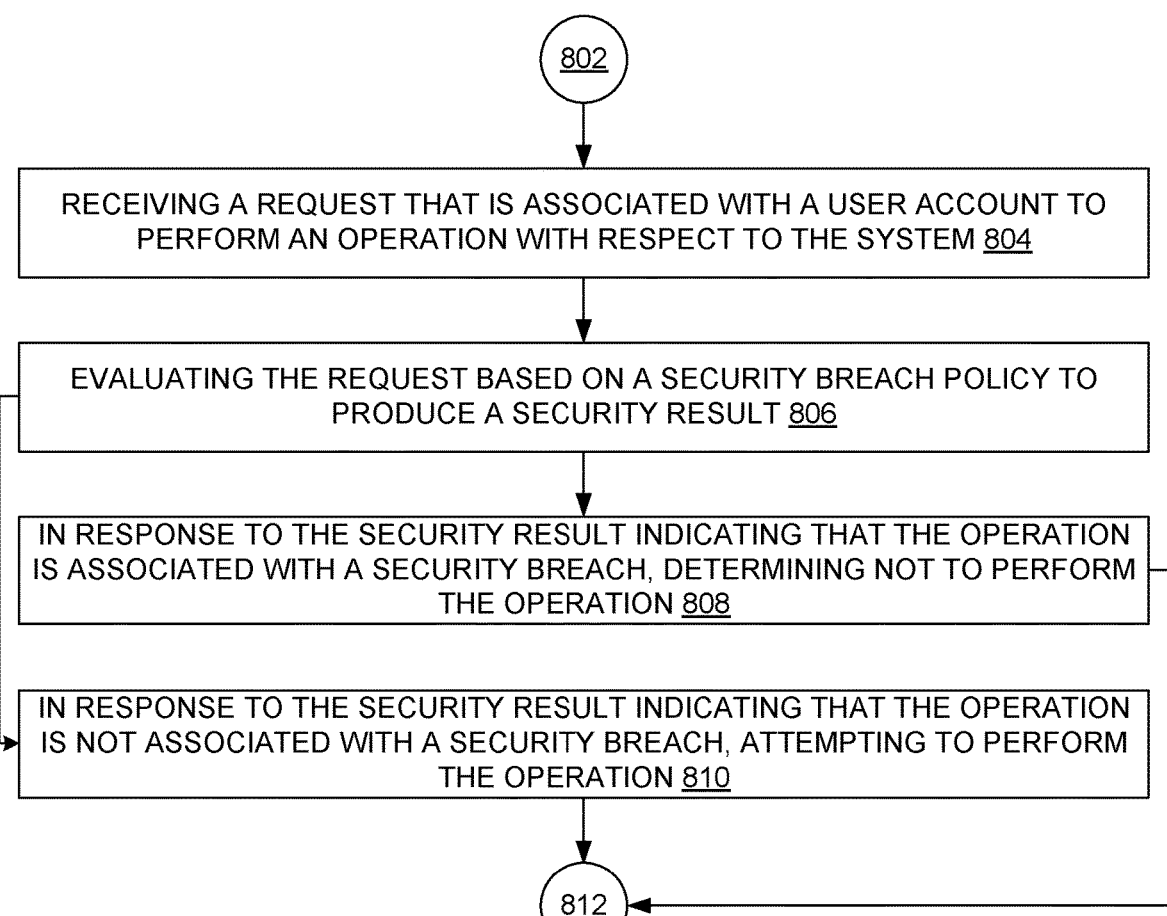

802

RECEIVING A REQUEST THAT IS ASSOCIATED WITH A USER ACCOUNT TO PERFORM AN OPERATION WITH RESPECT TO THE SYSTEM 804

EVALUATING THE REQUEST BASED ON A SECURITY BREACH POLICY TO PRODUCE A SECURITY RESULT 806

IN RESPONSE TO THE SECURITY RESULT INDICATING THAT THE OPERATION IS ASSOCIATED WITH A SECURITY BREACH, DETERMINING NOT TO PERFORM THE OPERATION 808

IN RESPONSE TO THE SECURITY RESULT INDICATING THAT THE OPERATION IS NOT ASSOCIATED WITH A SECURITY BREACH, ATTEMPTING TO PERFORM THE OPERATION 810

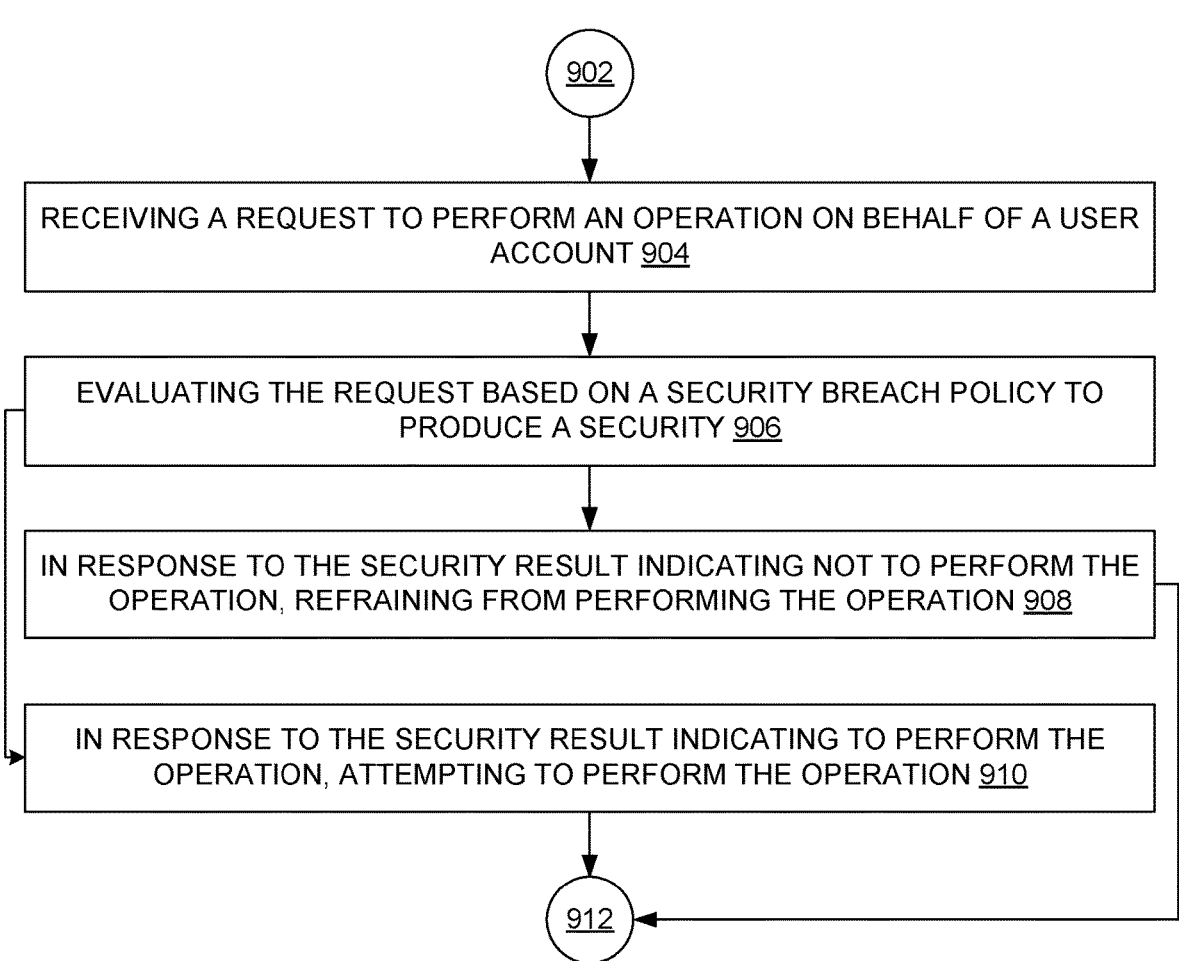

900

902

RECEIVING A REQUEST TO PERFORM AN OPERATION ON BEHALF OF A USER ACCOUNT 904

EVALUATING THE REQUEST BASED ON A SECURITY BREACH POLICY TO PRODUCE A SECURITY 906

IN RESPONSE TO THE SECURITY RESULT INDICATING NOT TO PERFORM THE OPERATION, REFRAINING FROM PERFORMING THE OPERATION 908

IN RESPONSE TO THE SECURITY RESULT INDICATING TO PERFORM THE OPERATION, ATTEMPTING TO PERFORM THE OPERATION 910

AUTO SECURITY BREACH IDENTIFICATION AND CORRECTION

BACKGROUND

Computer systems can implement security measures to prevent unauthorized access. Despite these security measures, some systems can be breached.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can evaluate the request based on a security breach policy to produce a security result. The system can, in response to determining that the security result indicates that there is a possible security breach, determine not to perform the operation, and perform a mitigating action regarding the possible security breach. The system can, in response to the security result indicating that the possible security breach does not exist, perform the operation.

An example method can comprise receiving, by a system comprising a processor, a request that is associated with a user account to perform an operation with respect to the system. The method can further comprise evaluating, by the system, the request based on a security breach policy to produce a security result. The method can further comprise, in response to the security result indicating that the operation is associated with a security breach, determining, by the system, not to perform the operation. The method can further comprise, in response to the security result indicating that the operation is not associated with a security breach, attempting, by the system to perform the operation.

An example non-transitory computer-readable medium can comprise instructions that, in response to execution, cause a system comprising a processor to perform operations. These operations can comprise receiving a request to perform an operation on behalf of a user account. These operations can further comprise evaluating the request based on a security breach policy to produce a security result. These operations can further comprise, in response to the security result indicating not to perform the operation, refraining from performing the operation. These operations can further comprise, in response to the security result indicating to perform the operation, attempting to perform the operation.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example process flow that can facilitate auto security breach identification and correction, in accordance with an embodiment of this disclosure;

FIG. 4 illustrates another example process flow that can facilitate auto security breach identification and correction, in accordance with an embodiment of this disclosure;

FIG. 5 illustrates another example process flow that can facilitate auto security breach identification and correction, in accordance with an embodiment of this disclosure;

FIG. 6 illustrates another example process flow that can facilitate auto security breach identification and correction, in accordance with an embodiment of this disclosure;

FIG. 7 illustrates another example process flow that can facilitate auto security breach identification and correction, in accordance with an embodiment of this disclosure;

FIG. 8 illustrates another example process flow that can facilitate auto security breach identification and correction, in accordance with an embodiment of this disclosure;

FIG. 9 illustrates another example process flow that can facilitate auto security breach identification and correction, in accordance with an embodiment of this disclosure;

DETAILED DESCRIPTION

Overview

Figure 1:
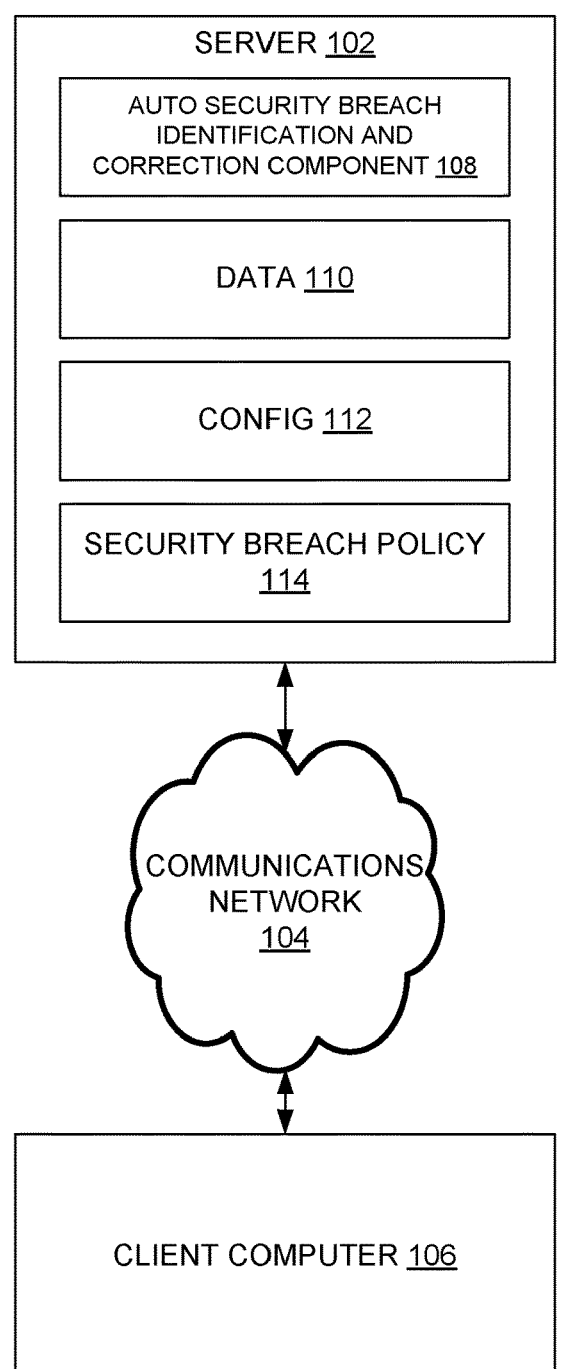
FIG. 1 illustrates an example system architecture that can facilitate auto security breach identification and correction, in accordance with an embodiment of this disclosure.

The present examples generally relate to computing clusters. It can be appreciated that the techniques can more generally be applied to scenarios where there are computer security breaches.

Some reasons for a computer security breach can include compromised user credentials, and compromised elevated user privileges. In such scenarios, a malicious user can attempt to use data and a computing cluster configuration in a wrong and unintended way.

Symptoms of a security breach can include too many delete operations in a directory by a single user within a short span of time; too many failed delete attempts within a short span of time; too many writes and/or edits on a sensitive directory by a single user within a short span of time; too many failed attempts of writes by a single user; too many DELETE performance application programming interface (PAPI) calls by a single user in a short span of time; and too many failed DELETE/PUT/POST PAPI attempts.

In these scenarios, it can be that an administrator needs to understand that a security breach has occurred, and then take corrective action on that user manually.

The present techniques can be implemented to automatically identify a security breach and take a corrective action on the affected user and/or environment.

The present techniques can be implemented to set default policies for a system to identify a security breach and take corrective actions. In some examples, administrators can edit these policies.

The present techniques can be applied in the following examples to facilitate auto security breach identification and correction.

In an example policy, a security breach can be identified where any user deletes 1,000 files within any directory within one minute. An automated corrective action can be to make that directory read-only, to not expire a snapshot of that directory for the next two hours, and to raise an alert about a possible data security breach to an administrator.

In another example policy, a security breach can be identified where 100 delete operations by a single user fail due to insufficient user privilege. An automated corrective action can be to make the directory read-only for the next 30 minutes, to prohibit the user from writing to the entire file system for the next hour (that is, making the user's privilege to be read-only), and to raise an alert about a possible data security breach to an administrator.

In another example policy, a security breach can be identified where a special directory (e.g., /home/special) is designated as a sensitive directory, and 50 write/edit operations by a single user are performed within 15 minutes. An automated corrective action can be to make the directory read-only, to initiate an antivirus scan for the edited/new files, and to raise an alert about a possible data security breach to an administrator.

In another example policy, a security breach can be identified where there are 30 DELETE PAPI calls by a single user within 1 minute. An automated corrective action can be to initiate a conFIG lock in the system, to take a config backup if the config has changed since the last successful backup, and to raise an alert about a possible data security breach to an administrator.

In another example policy, a security breach can be identified where there are 50 DELETE/PUT/POST PAPI calls that failed due to insufficient privilege within 2 minutes. An automated corrective action can be to initiate a config backup in the system immediately, to mark the possible malicious user as config read-only access for 1 hour (that is, whatever privileges the user might normally have, for the next hour the user will not have any config read-write permissions), and to raise an alert about a possible data security breach to an administrator.

It can be appreciated that factors such as a number of operations and a time period in which those operations occur are provided with example values, and that there can be other examples according to the present techniques that implement different values.

The present techniques can be applied to identify possible (data and config) security breaches, and to act on a malicious user along with an area of attack. The present techniques can also be applied to making a user read-only (separately or together for data and config) to the entire system regardless of the user's privilege at a different level.

These present techniques are in contrast to prior approaches, which can involve an administrator identifying a security breach manually, and then acting on the breach manually.

The present techniques can be implemented to facilitate an automated way of making a user account read-only. Prior approaches that use manual techniques can fail to facilitate this.

The present techniques can be implemented to facilitate an automated way of making a directory read-only for a period of time. In some examples, the amount of time can depend on a severity of an attack, where a higher severity can indicate a higher potential damage of a system. For example, a higher severity attack could be thousands of delete operations on a critical directory within one minute, while a lower severity attack could involve a lower rate of deletions on a non-critical directory.

The present techniques can be implemented to facilitate fast automated security actions. Manual action in prior approaches can be based on an event or a notification to an administrator. It can take time for an administrator to analyze an event and then take a proper action. A time of day can also matter (e.g., the night, administrators can be less responsive). So, with prior approaches there can be a longer gap between an event and an appropriate action as compared with the present techniques.

Example Architecture

FIG. 1 illustrates an example system architecture 100 that can facilitate auto security breach identification and correction, in accordance with an embodiment of this disclosure.

System architecture 100 comprises server 102, communications network 104, and client computer 106. In turn, server 102 comprises auto security breach identification and correction component 108, data 110, config 112, and security breach policy 114.

Figure 10:
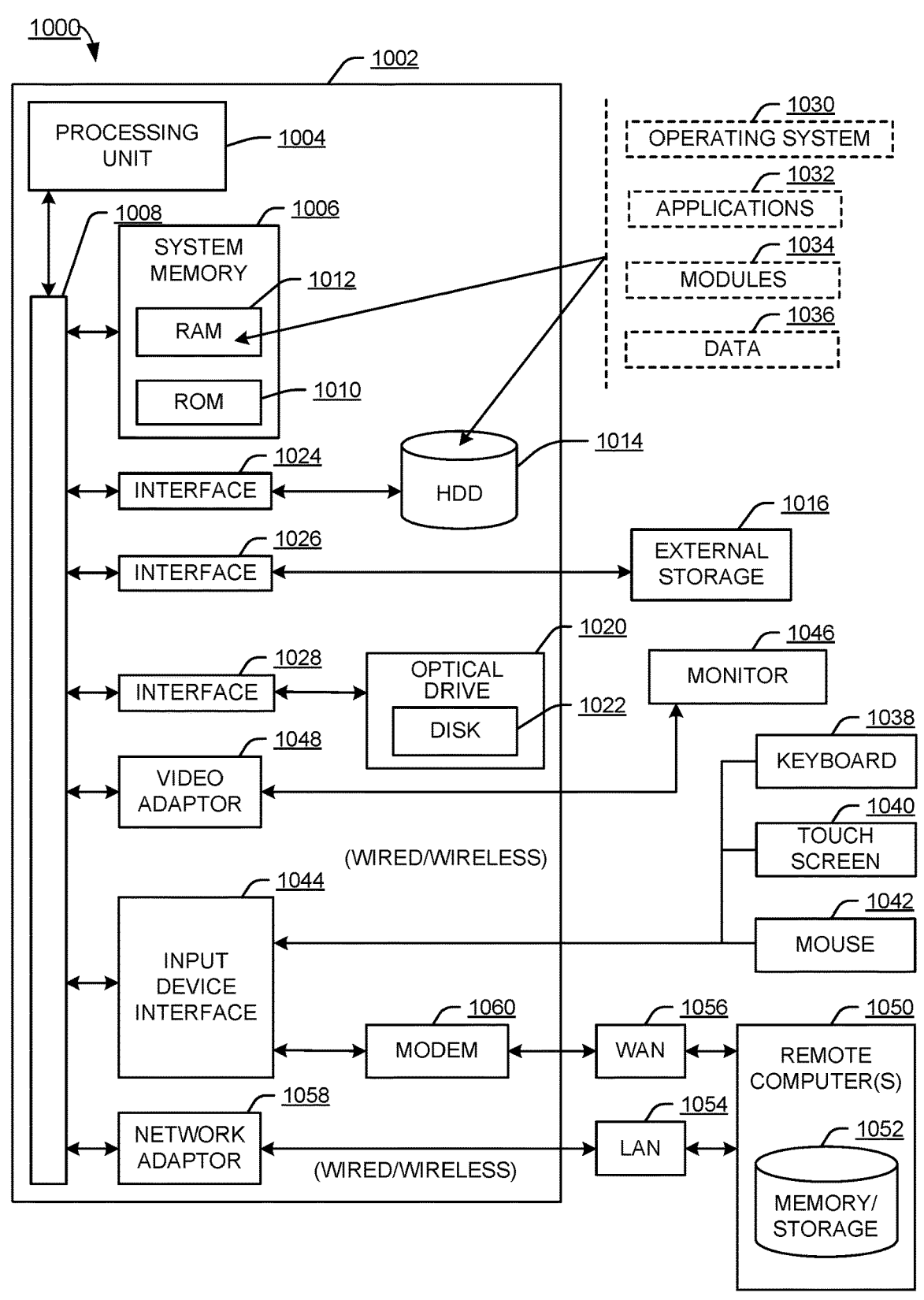
FIG. 10 illustrates an example block diagram of a computer operable to execute an embodiment of this disclosure.

Each of server 102 and/or client computer 106 can be implemented with part(s) of computing environment 1000 of FIG. 10. Communications network 104 can comprise a computer communications network, such as the Internet.

Data 110 can generally comprise computer data, such as that stored in files or objects. Config 112 can generally comprise configuration information for server 102.

Client computer 106 can access server 102 via communications network to access data 110 and/or config 112, to read and/or modify it. Where auto security breach identification and correction component 108 detects that client computer 106 is associated with a security breach, then auto security breach identification and correction component 108 can take mitigating action.

Auto security breach identification and correction component 108 detects that client computer 106 is associated with a security breach where client computer 106 has taken actions specified in security breach policy 114. Examples of security breach policies can include the identified security breaches and corresponding corrective actions described with respect to FIGS. 2-6.

In some examples, auto security breach identification and correction component 108 can implement part(s) of the process flows of FIGS. 2-9 to implement auto security breach identification and correction.

It can be appreciated that system architecture 100 is one example system architecture for auto security breach identification and correction, and that there can be other system architectures that facilitate auto security breach identification and correction.

Example Process Flows

Figure 2:
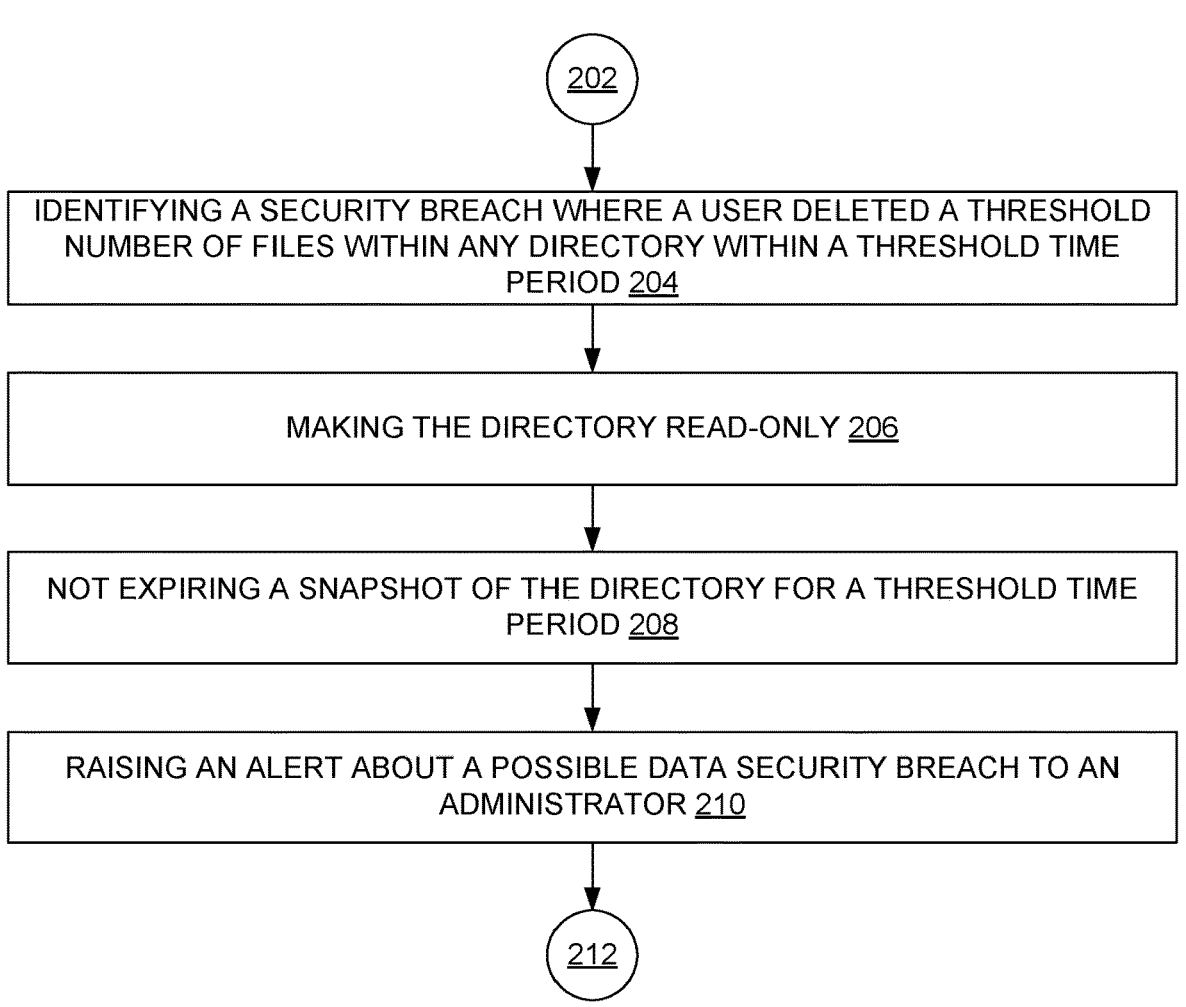
FIG. 2 illustrates an example process flow that can facilitate auto security breach identification and correction, in accordance with an embodiment of this disclosure.

FIG. 2 illustrates an example process flow 200 that can facilitate auto security breach identification and correction, in accordance with an embodiment of this disclosure. In some examples, one or more embodiments of process flow 200 can be implemented by auto security breach identification and correction component 108 of FIG. 1, or computing environment 1000 of FIG. 10.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 200 begins with 202, and moves to operation 204.

Operation 204 depicts identifying a security breach where a user deleted a threshold number of files within any directory within a threshold time period. In some examples, this can comprise deleting 1,000 files within any directory within one minute.

After operation 204, process flow 200 moves to operation 206.

Operation 206 depicts making the directory read-only. This can be the directory from operation 204 that is subject to the delete operations.

After operation 204, process flow 200 moves to operation 206.

Operation 208 depicts not expiring a snapshot of the directory for a threshold time period. That is, where a snapshot backup data has been made, this can be kept longer than otherwise so that data can be recovered from it. The threshold time period in operation 208 can be different from the threshold time period in operation 204 (e.g., 2 hours and 1 minute, respectively).

After operation 208, process flow 200 moves to operation 210.

Operation 210 depicts raising an alert about a possible data security breach to an administrator.

After operation 210, process flow 200 moves to 212, where process flow 200 ends.

FIG. 3 illustrates an example process flow 300 that can facilitate auto security breach identification and correction, in accordance with an embodiment of this disclosure. In some examples, one or more embodiments of process flow 300 can be implemented by auto security breach identification and correction component 108 of FIG. 1, or computing environment 1000 of FIG. 10.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 300 begins with 302, and moves to operation 304.

Operation 304 depicts identifying a security breach where a threshold number of delete operations by a single user account fail due to insufficient user privilege. In some examples, this can be 100 delete operations. Insufficient user privilege can be, for example, that the user account attempting the delete operations lacks write access for the files that the account is attempting to delete.

After operation 304, process flow 300 moves to operation 306.

Operation 306 depicts making the directory read-only for a threshold amount of time. This can be the directory from operation 304 where the delete operations are attempted. In some examples, the threshold amount of time can be 30 minutes.

After operation 306, process flow 300 moves to operation 308.

Operation 308 depicts prohibiting the usr account from writing to the entire file system for a threshold amount of time. This can be the user account that attempted the delete operations in operation 304, and the threshold amount of time can be an hour. An effect of this can be to make the user account's privileges to be read-only.

After operation 308, process flow 300 moves to operation 310.

Operation 310 depicts raising an alert about a possible data security breach to an administrator.

After operation 310, process flow 300 moves to 312, where process flow 300 ends.

FIG. 4 illustrates another example process flow 400 that can facilitate auto security breach identification and correction, in accordance with an embodiment of this disclosure. In some examples, one or more embodiments of process flow 400 can be implemented by auto security breach identification and correction component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404.

Operation 404 depicts identifying a security breach where a special directory is designated as a sensitive directory, and threshold number of write/edit operations by a single user account are performed within a threshold amount of time. In some examples, the threshold number of write/edit operations can be 50, and the time period can be 15 minutes. A directory can be designated as sensitive in response to user input data indicating the same.

After operation 404, process flow 400 moves to operation 406.

Operation 406 depicts making the directory read-only. This can be the directory from operation 404 where the delete operations are attempted. In some examples, the threshold amount of time can be 30 minutes.

After operation 406, process flow 400 moves to operation 408.

Operation 408 depicts initiating an antivirus scan for those files from operation 404 that are edited and/or new.

After operation 408, process flow 400 moves to operation 410.

Operation 410 depicts raising an alert about a possible data security breach to an administrator.

After operation 410, process flow 400 moves to 412, where process flow 400 ends.

FIG. 5 illustrates another example process flow 500 that can facilitate auto security breach identification and correction, in accordance with an embodiment of this disclosure. In some examples, one or more embodiments of process flow 500 can be implemented by auto security breach identification and correction component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts identifying a security breach where there are a threshold number of DELETE papi calls by a single user account within a threshold amount of time. In some examples, this can be 30 calls within 1 minute.

After operation 504, process flow 500 moves to operation 506.

Operation 506 depicts initiating a config lock in the system.

After operation 506, process flow 500 moves to operation 508.

Operation 508 depicts taking a config backup if the config has changed since the last successful backup.

After operation 508, process flow 500 moves to operation 510.

Operation 510 depicts raising an alert about a possible data security breach to an administrator.

After operation 510, process flow 500 moves to 512, where process flow 500 ends.

FIG. 6 illustrates another example process flow 600 that can facilitate auto security breach identification and correction, in accordance with an embodiment of this disclosure. In some examples, one or more embodiments of process flow 600 can be implemented by auto security breach identification and correction component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604.

Operation 604 depicts identifying a security breach where there are a threshold number DELETE/PUT/POST papi calls that failed due to insufficient privilege within a threshold time period. In some examples, this can be 50 calls within 2 minutes.

After operation 604, process flow 600 moves to operation 606.

Operation 606 depicts initiating a config lock in the system.

After operation 606, process flow 600 moves to operation 608.

Operation 608 depicts setting the user account to config read-only access for a threshold amount of time. The threshold amount of time in operation 608 can differ from the threshold amount of time in operation 604 (e.g., 1 hour, and 2 minutes, respectively). That is, it can be that, whatever privileges the user account might normally have, for the next threshold amount of time the user account will not have any config read-write permissions.

After operation 608, process flow 600 moves to operation 610.

Operation 610 depicts raising an alert about a possible data security breach to an administrator.

After operation 610, process flow 600 moves to 612, where process flow 500 ends.

FIG. 7 illustrates an example process flow 700 that can facilitate auto security breach identification and correction, in accordance with an embodiment of this disclosure. In some examples, one or more embodiments of process flow 700 can be implemented by auto security breach identification and correction component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts receiving a request that is associated with a user account to perform an operation on the system. That is, using the example of FIG. 1, server 102 can receive a message from client computer 106 via communications network 104 to perform an operation on data 110 and/or config 112. In some examples, this operation can comprise a delete operation, a write operation, or an edit operation.

After operation 704, process flow 700 moves to operation 706.

Operation 706 depicts evaluating the request based on a security breach policy to produce a security result. This security breach policy can comprise security breach policy 114 of FIG. 1.

After operation 706, process flow 800 moves to operation 708 or 710, depending on the security result.

Operation 708 is reached from operation 706 where the security result indicates that there is a possible security breach. Operation 708 depicts, in response to determining that the security result indicates that there is a possible security breach, determining not to perform the operation, and performing a mitigating action regarding the possible security breach. That is, it can be that, where the operation triggers a security breach, then the operation is not performed, and a corrective action is performed.

In some examples, the request comprises deleting more than a first threshold number of files in a directory within a second threshold amount of time. For example, the request can comprise a user account deleting 1,000 files in a directory within 1 minute. In some examples, the corresponding mitigating action regarding the possible security breach comprises making the directory read-only. In some examples, the corresponding mitigating action regarding the possible security breach comprises determining not to expire a snapshot of the directory for a determined period of time.

In some examples, the mitigating action regarding the possible security breach comprises raising an alert about the possible security breach to an administrator account.

In some examples, the request comprises more than a threshold number of failed delete attempts on a directory due to insufficient privileges associated with the user account within a threshold amount of time. For example, there can be 100 failed deletes on a directory by a single user account due to insufficient user privilege within 5 minutes. In some examples, the corresponding mitigating action regarding the possible security breach comprises making the directory read-only for a specified period of time. In some examples, the corresponding mitigating action regarding the possible security breach comprises setting the user account to have read-only privileges for a specified amount of time.

After operation 708, process flow 700 moves to 712, where process flow 700 ends.

Operation 710 is reached from operation 706 where the security result indicates that the possible security breach does not exist. Operation 710 depicts, in response to the security result indicating that the possible security breach does not exist, performing the operation. That is, it can be that where the operation does not trigger a security breach, then the operation can be performed.

After operation 710, process flow 700 moves to 712, where process flow 700 ends.

FIG. 8 illustrates an example process flow 800 that can facilitate auto security breach identification and correction, in accordance with an embodiment of this disclosure. In some examples, one or more embodiments of process flow 800 can be implemented by auto security breach identification and correction component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts receiving a request that is associated with a user account to perform an operation with respect to the system. In some examples, operation 804 can be implemented in a similar manner as operation 704 of FIG. 7.

After operation 804, process flow 800 moves to operation 806.

Operation 806 depicts evaluating the request based on a security breach policy to produce a security result. In some examples, operation 806 can be implemented in a similar manner as operation 706 of FIG. 7.

After operation 806, process flow 800 moves to operation 808 or 810, depending on the security result.

Operation 808 is reached from operation 806 where the security result indicates that the operation is associated with a security breach. Operation 808 depicts, in response to the security result indicating that the operation is associated with a security breach, determining not to perform the operation. In some examples, operation 808 can be implemented in a similar manner as operation 708 of FIG. 7.

In some examples, the request comprises performing at least a threshold of write or edit operations in a directory within a threshold amount of time. That is, there can be 50 write/edits by a single user within 15 minutes to a directory designated as sensitive. In some examples, the corresponding determining not to perform the operation comprises making the directory read-only for a determined period of time. In some examples, the corresponding determining not to perform the operation comprises initiating an antivirus scan for files of the directory that were written to or edited via the user account within the threshold amount of time.

In some examples, the request comprises at least a threshold of delete performance application programming interface calls within a threshold amount of time. In some examples, the corresponding determining not to perform the operation comprises abstaining from performing the operation by initiating a configuration lock. In some examples, the corresponding determining not to perform the operation comprises performing a configuration backup in response to determining that a configuration has changed since a most-recently successful configuration backup was performed.

After operation 808, process flow 800 moves to 812, where process flow 800 ends.

Operation 810 is reached from operation 806 where the security result does not indicate that the operation is associated with a security breach. Operation 810 depicts, in response to the security result indicating that the operation is not associated with a security breach, attempting to perform the operation. In some examples, operation 810 can be implemented in a similar manner as operation 710 of FIG. 7.

After operation 810, process flow 800 moves to 812, where process flow 800 ends.

FIG. 9 illustrates an example process flow 900 that can facilitate auto security breach identification and correction, in accordance with an embodiment of this disclosure. In some examples, one or more embodiments of process flow 900 can be implemented by auto security breach identification and correction component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts receiving a request to perform an operation on behalf of a user account. In some examples, operation 904 can be implemented in a similar manner as operation 704 of FIG. 7.

After operation 904, process flow 900 moves to operation 906.

Operation 906 depicts evaluating the request based on a security breach policy to produce a security result. In some examples, operation 906 can be implemented in a similar manner as operation 706 of FIG. 7.

After operation 906, process flow 900 moves to operation 908 or 910, depending on the security result.

Operation 908 is reached from operation 908 where the security result indicates not to perform the operation. Operation 808 depicts, in response to the security result indicating not to perform the operation, refraining from performing the operation. In some examples, operation 908 can be implemented in a similar manner as operation 708 of FIG. 7.

In some examples, the request comprises at least a threshold of delete, put, or post performance application programming interface calls that failed due to an insufficient privilege associated with the user account within a threshold amount of time. That is, the request can comprise 50

DELETE/POST/PUT papi calls that have failed due to insufficient user account privilege within 2 minutes. In some examples, the corresponding refraining from performing the operation comprises performing a configuration backup. In some examples, the corresponding refraining from performing the operation comprises setting the user account to have read-only privileges for configuration changes for a determined amount of time.

In some examples, the request comprises at least a threshold of failed write operations associated with the user account within a threshold amount of time. That is, there can be too many failed attempts of writes by a single user account.

After operation 908, process flow 900 moves to 912, where process flow 900 ends.

Operation 910 is reached from operation 906 where the security result indicates to perform the operation. Operation 910 depicts, in response to the security result indicating to perform the operation, attempting to perform the operation. In some examples, operation 910 can be implemented in a similar manner as operation 710 of FIG. 7.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of server 102 and/or client computer 106 of FIG. 1.

In some examples, computing environment 1000 can implement one or more embodiments of the process flows of FIGS. 2-9 to facilitate auto security breach identification and correction.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi- core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that, in response to execution by the at least one processor, cause the system to perform operations, comprising:
receiving a request that is associated with a user account to perform an operation on the system, wherein the request comprises more than a threshold number of failed delete attempts on a directory due to insufficient privileges associated with the user account within a threshold amount of time;
evaluating the request based on a security breach policy with respect to a number of instances of an action previously taken by the user account on the system within the threshold amount of time to produce a security result that is indicative of whether the user account satisfies a malicious user criterion;
in response to determining that the security result indicates that there is a possible security breach that is indicative of the user account satisfying the malicious user criterion,
determining not to perform the operation, and
performing a mitigating action regarding the possible security breach, wherein performing the mitigating action regarding the possible security breach comprises making the directory read-only for a specified period of time, or wherein performing the mitigating action regarding the possible security breach comprises setting the user account to have read-only privileges for the specified period of time; and
in response to the security result indicating that the possible security breach does not exist, performing the operation.

2. The system of claim 1, wherein the request comprises deleting more than a threshold number of files in a directory within the threshold amount of time.

3. The system of claim 2, wherein performing the mitigating action regarding the possible security breach comprises determining not to expire a snapshot of the directory for a determined period of time.

4. The system of claim 1, wherein performing the mitigating action regarding the possible security breach comprises raising an alert about the possible security breach to an administrator account.

5. The system of claim 1, wherein the performing of the mitigating action regarding the possible security breach comprises initiating an antivirus scan for files of the directory that were written to or edited via the user account within the threshold amount of time.

6. The system of claim 1, wherein the request comprises at least a threshold of delete performance application programming interface calls within the threshold amount of time.

7. The system of claim 1, wherein the performing of the mitigating action regarding the possible security breach comprises abstaining from performing the operation by initiating a configuration lock.

8. The system of claim 1, wherein the performing of the mitigating action regarding the possible security breach comprises performing a configuration backup in response to determining that a configuration has changed since a most-recently successful configuration backup was performed.

9. A method, comprising:
receiving, by a system comprising at least one processor, a request that is associated with a user account to perform an operation with respect to the system, wherein the request comprises performing at least a threshold of write or edit operations in a directory within a threshold amount of time;
evaluating, by the system, the request based on a security breach policy with respect to a number of instances of an action previously taken by the user account on the system within the threshold amount of time to produce a security result that is indicative of whether the user account satisfies a malicious user criterion;
in response to the security result indicating that the operation is associated with a security breach that is indicative of the user account satisfying the malicious user criterion, determining, by the system, not to perform the operation, wherein the determining not to perform the operation comprises making the directory read-only for a determined period of time, or wherein the determining not to perform the operation comprises setting the user account to have read- only privileges for the determined period of time; and
in response to the security result indicating that the operation is not associated with a security breach, attempting, by the system, to perform the operation.

10. The method of claim 9, wherein the determining not to perform the operation comprises initiating an antivirus scan for files of the directory that were written to or edited via the user account within the threshold amount of time.

11. The method of claim 9, wherein the request comprises at least a threshold of delete performance application programming interface calls within the threshold amount of time.

12. The method of claim 9, wherein the determining not to perform the operation comprises abstaining from performing the operation by initiating a configuration lock.

13. The method of claim 9, wherein the determining not to perform the operation comprises performing a configuration backup in response to determining that a configuration has changed since a most-recently successful configuration backup was performed.

14. A non-transitory computer-readable medium comprising instructions that, in response to execution, cause a system comprising at least one processor to perform operations, comprising:

receiving a request to perform an operation on behalf of a user account, wherein the request comprises at least a threshold of delete, put, or post performance application programming interface calls that failed due to an insufficient privilege associated with the user account within a threshold amount of time;

evaluating the request based on a security breach policy with respect to a number of instances of an action previously taken by the user account on the system within the threshold amount of time to produce a security result that is indicative of whether the user account satisfies a malicious user criterion;

in response to the security result indicating not to perform the operation based on the security result indicating that the user account satisfies the malicious user criterion, refraining from performing the operation, wherein the refraining from performing the operation comprises making a directory read-only for a determined amount of time, or wherein the refraining from performing the operation comprises setting the user account to have read-only privileges for the determined amount of time; and in response to the security result indicating to perform the operation, attempting to perform the operation.

15. The non-transitory computer-readable medium of claim 14, wherein the refraining from performing the operation comprises performing a configuration backup.

16. The non-transitory computer-readable medium of claim 14, wherein the request comprises at least a threshold of failed write operations associated with the user account within the threshold amount of time.

17. The non-transitory computer-readable medium of claim 14, wherein the refraining from performing the operation comprises initiating an antivirus scan for files of the directory that were written to or edited via the user account within the threshold amount of time.

18. The non-transitory computer-readable medium of claim 14, wherein the request comprises at least a threshold of delete performance application programming interface calls within the threshold amount of time.

19. The non-transitory computer-readable medium of claim 14, wherein the refraining from performing the operation comprises abstaining from performing the operation by initiating a configuration lock.

20. The non-transitory computer-readable medium of claim 14, wherein the refraining from performing the operation comprises performing a configuration backup in response to determining that a configuration has changed since a most-recently successful configuration backup was performed.

* * * * *